No. 752,025. PATENTED FEB. 16, 1904.
P. S. BRINDLE.
NUT LOCK.
APPLICATION FILED JULY 16, 1903.
NO MODEL.
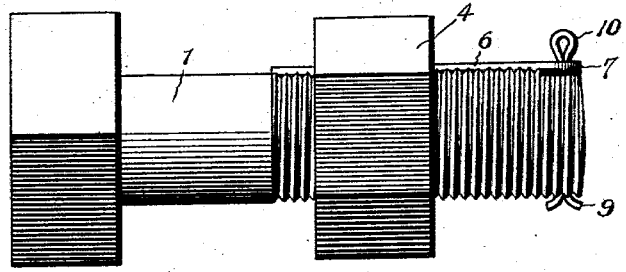
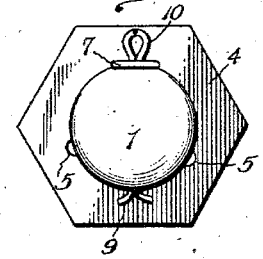
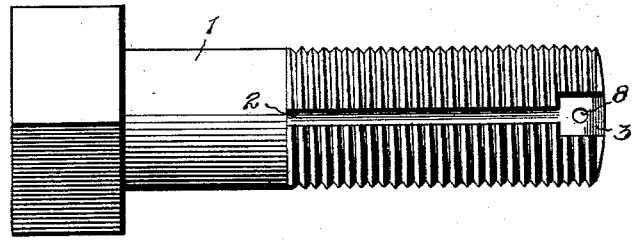
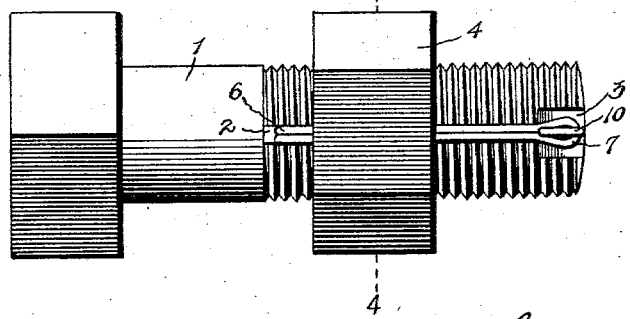
Witnesses
Ralph A. Shepard
H. J. Shepard
Philip S. Brindle, Inventor
by C. C. Shepherd, Attorney No. 752,025.

Patented February 16, 1904.

UNITED STATES PATENT OFFICE.

PHILIP S. BRINDLE, OF COLUMBUS, OHIO, ASSIGNOR, BY DIRECT AND MESNE ASSIGNMENTS, TO FRANK N. HAMMOND, FRED M. HAMMOND, CHARLES P. MOSHER, JR., CLARENCE E. WOOLMAN, AND CHARLES J. PRETZMAN, OF COLUMBUS, OHIO.

NUT-LOCK.

SPECIFICATION forming part of Letters Patent No. 752,025, dated February 16, 1904.

Application filed July 16, 1903. Serial No. 165,802. (No model.)

*To all whom it may concern:*

Be it known that I, PHILIP S. BRINDLE, a citizen of the United States, residing at Columbus, in the county of Franklin and State of Ohio, have invented a certain new and useful Improvement in Nut-Locks, of which the following is a specification.

This invention relates to nut-locks, and has for its object to provide improved means for interlocking the nut with the bolt in a simple and effective manner without regard to any special application of the bolt.

It is a further object of the invention to facilitate the locking and unlocking of the nut without damage to either of these members, and thereby to provide for the repeated use of the same bolt and nut.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is an elevation of a bolt and nut interlocked by means of the present invention. Fig. 2 is a plan view thereof. Fig. 3 is an elevation looking at the front face of the nut. Fig. 4 is a sectional view on the line 4 4 of Fig. 2. Fig. 5 is a detail view of the bolt.

Like characters of reference designate corresponding parts in each and every figure of the drawings.

In carrying out the present invention an ordinary bolt 1 has its threaded portion interrupted by a longitudinal groove or way 2, which intersects the outer end of the bolt, and the latter is slightly flattened, as at 3, across the outer end of the groove.

The nut 4 is of usual form and has the threads of its bolt-opening interrupted by one or more grooves 5 for alinement with the groove of the bolt. While the nut has been shown as provided with three grooves, it is not desired to be understood that the number is essential, as more or a less number of grooves may be employed without affecting the utility of the device. When the nut has been tightened and one of its grooves alined with the groove of the bolt, a locking-key 6 is driven into alined grooves, so as to lock the nut against accidental turning. To prevent displacement of the key, it is designed to connect the same to the bolt, and this is accomplished by providing the key with an outer terminal eye 7 to register with a diametric opening 8, formed through the flattened portion of the bolt, and a pin 9 is passed through the eye and the opening. It is preferred to have the key and the pin in the form of a cotter-pin, and the ends of the pin 9 are separated and bent back against the bolt to prevent endwise displacement of the pin in one direction, and the eye portion 10 forms a head to prevent displacement of the pin in the opposite direction.

From the foregoing description it is apparent that the present invention provides exceedingly simple and efficient means for interlocking the bolt and the nut without damage to either of these members whereby the same may be repeatedly used, and the application of the present invention does not in any manner shorten the life of the bolt and nut. Moreover, should the pins or keys become broken or damaged, they may be readily replaced at slight expense.

Having thus described the invention, what is claimed, and desired to be secured by Letters Patent, is—

1. The combination of a bolt having a longitudinal groove intersecting the screw-threaded part thereof and an opening intersecting the groove, a nut having a groove intersecting the threads of the bore thereof for alinement with the groove of the bolt, a key to be fitted in the alined grooves and provided with an opening to register with the opening of the bolt, and a pin to be inserted in the opening of the bolt to prevent displacement of the key.

2. The combination of a bolt having a longitudinal groove intersecting the screw-threaded part thereof, and a diametric opening intersecting the outer end portion of the groove, a nut having a groove in the bolt-opening thereof for alinement with the groove in the bolt, a split cotter-pin to be inserted in the alined grooves of the bolt and nut with its open head registered with the opening of the bolt, and a split cotter-pin to be inserted through the open head of the first-mentioned pin and through the opening in the bolt to interlock the nut and bolt.

PHILIP S. BRINDLE.

In presence of—
C. C. SHEPHERD,
A. L. PHELPS.